Oct. 23, 1956     S. E. CORBIN     2,767,540

ELECTRIC LAWN EDGER

Filed June 15, 1953

STANLEY E. CORBIN
INVENTOR.

BY

ATTORNEY

United States Patent Office 2,767,540
Patented Oct. 23, 1956

2,767,540

ELECTRIC LAWN EDGER

Stanley E. Corbin, Los Angeles, Calif.

Application June 15, 1953, Serial No. 361,678

4 Claims. (Cl. 56—25.4)

This invention relates to devices for trimming the edges of lawns and particularly to such devices which are power driven.

It is an object of the invention to provide an electrically driven lawn edger which is relatively light in weight and of simple, inexpensive but rugged construction.

Figure 1:
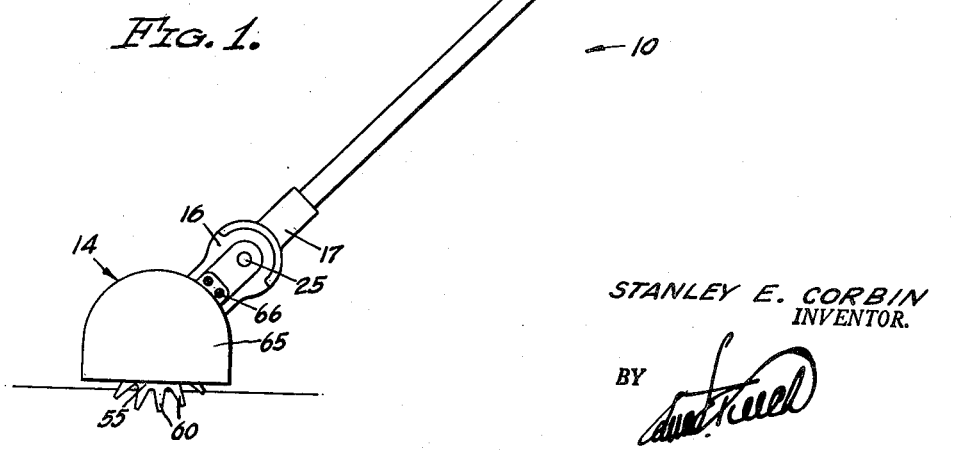

The manner of accomplishing the foregoing object as well as further objects and advantages will be made manifest in the following description taken in connection with the accompanying drawing in which Fig. 1 is a side elevational view of a preferred embodiment of the invention with the same in operating position for trimming a lawn along the edge of a sidewalk.

Figure 2:
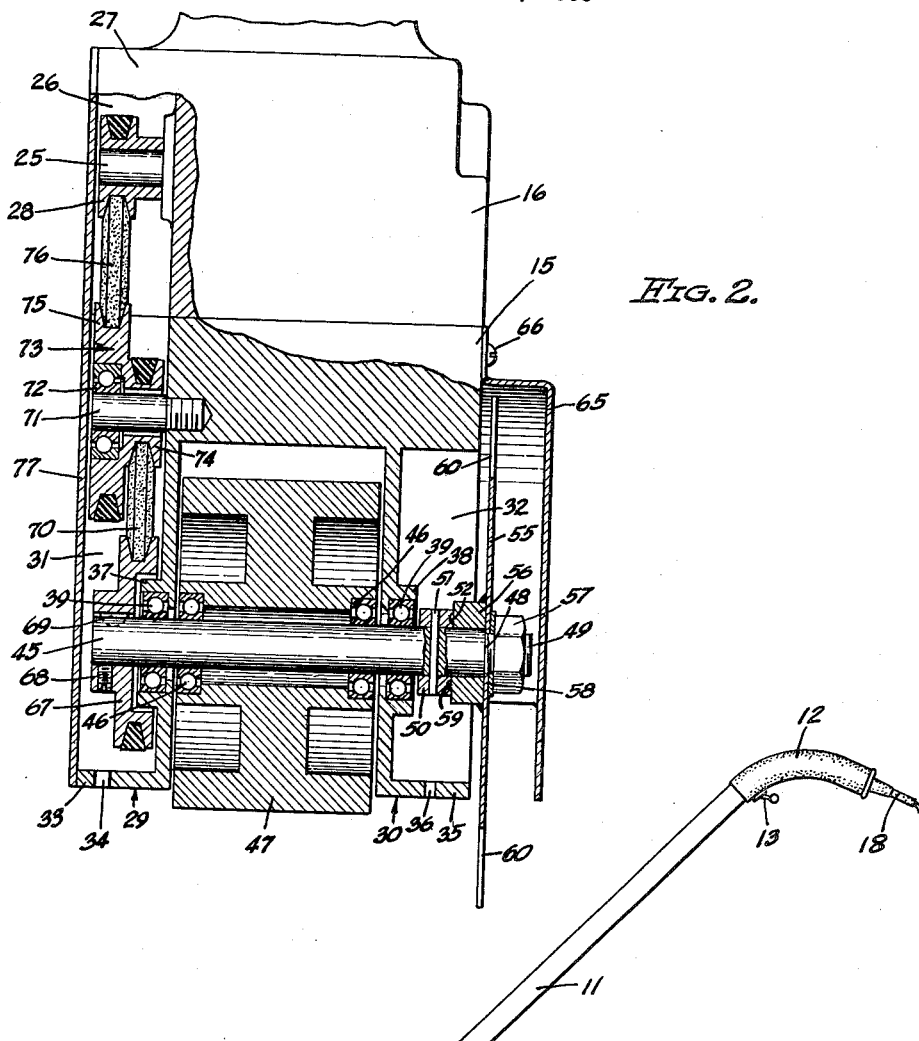

Fig. 2 is an enlarged fragmentary front elevational view, with parts broken away and shown in section of the working mechanism of the lawn edger shown in Fig. 1.

Referring specifically to the drawings, the invention is there shown as embodied in an electric lawn edger 10, including a hollow handle 11 provided at its upper end with a hand grip 12 and an electric switch 13 and connecting at its lower end to a unitary operating mechanism 14.

The mechanism 14 includes a frame 15 and an electric motor 16 rigidly secured thereto in any desired manner, this motor having a socket 17 into which the lower end of the handle 11 fits and to which it is rigidly secured.

The motor 16 is adapted to be energized by electricity supplied through a flexible electric service cord 18 which passes through the hollow handle 11, includes in its circuit the switch 13, and then extends from the outer end of the hand grip 12 to a suitable electric service connection. The motor 16 which is preferably of a light, high-speed type adapted to run approximately 8000 R. P. M. has a shaft 25 which extends from one end of the motor into a recess 26 provided in a housing 27 which is an integral part of the motor. Fixed on an end of motor shaft 25 extending into recess 26 is a drive pulley 28.

The frame 15 is formed to provide two parallel legs 29 and 30 which extend downwardly from the frame 15, both of these legs being hollowed externally to form recesses 31 and 32. Recess 31 joins with the recess 26 and has a bottom wall 33 provided with a hole 34. The recess 32 has a bottom wall 35 having a hole 36.

The legs 29 and 30 have external co-axial bosses 37 and 38 which are centrally bored and counterbored to receive ball bearings 39. Mounted in said bearings, as by a press fit therein, is a cutter mounting shaft 45 which carries ball bearings 46 which are located just inwardly from bearings 39 and on which an idle lawn edger supporting roller 47 is mounted.

The end portion of the shaft 45 which extends through the recess 32 is reduced in diameter to form a shoulder 48 thereon, outwardly from which are provided threads 49. A collar 50 is pressed over this end of shaft 45, inwardly from shoulder 48, and is fixed to said shaft as by a pin 51 extending diametrically through said shaft and collar. Pin 51 is adapted to be placed in alignment with hole 36 for the insertion or removal of said pin. Collar 50 is provided with circumferentially spaced pockets 52 for a purpose which will be made clear hereinafter.

A cutter disk 55 having a hub 56 welded thereto is adapted to be slipped over the end of shaft 45 against collar 50 and held mounted on the shaft by a nut 57 screwed onto the threads 49 of the shaft. The disk 55 has a central hole of such diameter as to bring this disk against the shoulder 48 so that the disk is clamped against this shoulder by nut 57 when the latter is tightened against said disk. To prevent accidental removal of the nut 57, a lock washer 58 is preferably interposed between the disk 55 and nut 57. To prevent rotation of the disk 55 relative to the shaft 45, the disk hub 56 is provided with lugs 59 which fit into the pockets 52 formed in collar 50 when the disk is assembled on the shaft as shown in Fig. 2. Any alternative locking, of course, may be used for locking the disk 55 to the shaft, as for instance, a key connecting said shaft and the hub 56, or a pin extending therethrough.

The cutter disk 55 is provided with a circumferentially endless series of cutter teeth 60, the edges of which in the direction of their travel are sharpened so as to cut the grass and roots into contact with which these teeth are brought in the operation of the lawn edger 10.

A sheet metal guard 65 is secured in place on the frame 15 by screws 66 so as to cover that portion of the cutter disk 55 which lies above the level of the lower end of the leg 30 when the handle 11 is sloped as shown in Fig. 1 in using the edger 10.

Fixed on the opposite end of the shaft 45 from the cutter disk 55 is a driven pulley 67 which may be held in place by a set screw 68 and secured against rotation on the shaft 45 by a key 69. The pulley 67 is recessed on the inner face thereof so as to overlie the boss 37 and thus permit an endless belt 70 entrained thereabout to lie in the innermost half of the recess 31. Mounted on the frame 15 is a counter-shaft 71 onto the outer end of which the inner race of a ball bearing 72 is pressed, the outer race of this bearing being pressed into a suitable cavity provided in a double pulley 73 which is thus rotatably mounted on said shaft 71. The pulley 73 includes an inner pulley 74 about which belt 70 is trained so as to connect this pulley with pulley 67. Pulley 73 also includes a pulley 75 which is located in the outer half of recess 31 so as to be radially aligned with pulley 28 with which it is connected by an endless belt 76 trained thereabout.

The recesses 26 and 31 unite at their adjacent ends in alignment with each other as shown in Fig. 2 and are covered by a single cover plate 77 which is secured in place in any suitable manner as by screwing this to the motor housing 27 and frame 15.

As may be noted, considerable opportunity is given by the design of my invention for providing a six to one reduction in speed between motor shaft 25 and the cutter shaft 45 or any desired lesser amount of reduction. Where a motor 16 is used which rotated under its normal load at 8000 R. P. M., I prefer to arrange the relative diameters of the pulleys 28, 67, 74, and 75 so that the cutter disk 55 is rotated at approximately 2000 R. P. M. One of the distinct advantages of the invention, however, is its capacity for variation in this driving ratio and it is not limited to any given ratio between the speed of the motor and the speed of the cutter disk.

In using the lawn edger 10, the conductor 18 is provided in sufficient length to connect the free end of this to a service outlet and leave complete freedom to the operator to manipulate the edger 10 wherever it is necessary to use the same on that particular job. The edging is usually done where the lawn meets a concrete or masonry walk. It is optional in rolling the edger along the line on which it is desired to trim the edge of the lawn that the roller 47 be either rolled on the walk or on the lawn itself. The switch 13 is turned on upon starting operations so that the motor 16 drives the edger disk 55 at a rapid speed of rotation so that the cutter teeth 60 cut the grass and roots engaged thereby during the travel of the edger.

The ball bearings 39, 46 and 72 used in the edger 10 are preferably of the double-sealed self-lubricating type which operate for a year or more, under normal use, without requiring lubrication. Compactness and ruggedness and relatively light weight are realized by my invention in using a common shaft for driving the cutter disk 55 and for mounting the supporting roller 47 of the edger. This also permits the use of a standard type of electric motor 16 which may thus be secured at a relatively small cost.

While I have disclosed for illustrative purposes, only a single embodiment of my invention, it is to be understood that various changes and modifications may be made in this without departing from the spirit of the invention or the scope of the appended claims.

The claims are:

1. In an electric lawn edger, the combination of: an electric motor having a housing, a frame secured to said housing, a pair of spaced, parallel legs formed on said frame and extending therefrom, co-axial bearings provided on said legs, a cutter disk shaft journaling in said bearings, a supporting roller disposed between said legs and rotatably mounted on said shaft, a cutter disk mounted on one end of said shaft and extending downwardly below the lower level of said legs and said supporting roller, drive transmission means connecting the opposite end of said shaft with said electric motor, and a handle mounted on said lawn edger for manipulating the same in the operation thereof.

2. A combination, as in claim 1, in which said transmission means includes a jack shaft provided on said frame, a double pulley rotatably mounted on said jack shaft, a drive pulley provided on said motor, a driven pulley mounted on said cutter disk shaft, and endless belts connecting said drive and driven pulleys with said double pulley.

3. A combination, as in claim 2, in which said bearings in said legs are ball bearings, the leg adjacent said transmission means having a deep recess formed in the outer face thereof, hollow bosses formed on said legs and extending laterally outwardly therefrom to accommodate said ball bearings, said driven pulley having an inner cavity which receives the adjacent bearing boss so that said pulley is adapted to receive a belt disposed in the inner half of said recess, the other belt of said transmission lying in the outer half of said recess.

4. A combination, as in claim 3, in which said supporting roller is provided with a pair of spaced ball bearings through the inner races of which said disk drive shaft extends.

References Cited in the file of this patent
UNITED STATES PATENTS

| | | |
|---|---|---|
| 2,478,813 | Esleck | Aug. 9, 1946 |
| 2,618,919 | Hutchens | Nov. 25, 1952 |
| 2,630,665 | Lauer | Mar. 10, 1953 |